July 10, 1945.  F. D. WELDEN  2,380,001

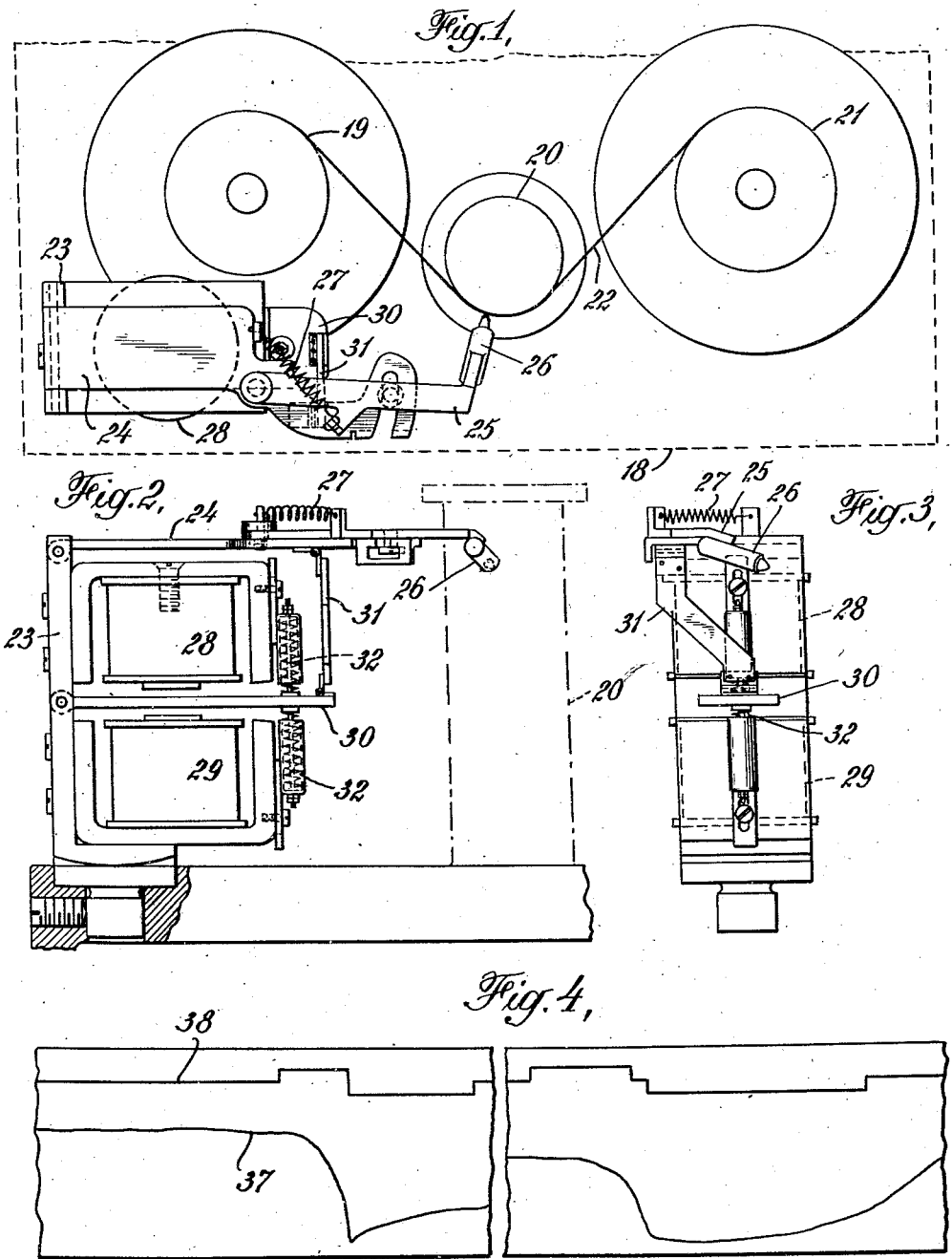

LOCOMOTIVE BOOSTER RECORDER

Filed Jan. 12, 1944   2 Sheets-Sheet 2

INVENTOR.
FAY D. WELDEN

BY
Pennie, Davis, Marvin, & Edmonds
ATTORNEYS

Patented July 10, 1945

2,380,001

UNITED STATES PATENT OFFICE 2,380,001

LOCOMOTIVE BOOSTER RECORDER

Fay D. Welden, Tuckahoe, N. Y., assignor to Valve Pilot Corporation, New York, N. Y., a corporation of New York Application January 12, 1944, Serial No. 517,955

4 Claims. (Cl. 105—48)

This invention relates to apparatus for recording the operation of a locomotive booster.

A booster is used as an auxiliary engine to supply additional traction, particularly on starting or on heavy grades. Most railroads have prescribed rules for booster operation: the booster must be idled a given time before use to free the mechanism of condensed steam and to assure positive operation; it must not be cut in at locomotive speeds above a specified minimum, say twelve miles an hour, or continued in service at locomotive speeds above a specified maximum, say twenty-two miles an hour. This means that if a train is negotiating a grade and decelerating rapidly, the engineer must wait until his speed has dropped to twelve miles an hour, or lower, before he may augment his power output by the use of his booster; it means, too, that when using the booster for supplementary starting power, it must be cut out before the train attains a speed of more than twenty-two miles an hour.

Although the engineer is expected to observe these rules, and doubtless does, no means are at present available for making a record of booster operation, showing for each trip the duration of each period of inactivity, idling and running and the speeds at which the booster was cut in and cut out. It is the object of the present invention to provide such means. I achieve this object by mounting a stylus to write upon the speed record tape of the locomotive and moving it in response to the operation of the booster to make distinctive or significant marks on the tape. Preferably I actuate this stylus by either of two electromagnets, one of which is energized when the booster is idling, the other when it is running, and neither when it is inactive.

In the accompanying drawings I have illustrated certain preferred embodiments of my invention a study of which will make clear the principles involved.

In these drawings—

Figure 1 is a plan view of the ordinary instrument housing showing the record tape rolls and the recorder of the present invention;

Figure 2 is a front elevation of the parts shown in Figure 1;

Figure 3 is an end view of the stylus and its operating mechanism;

Figure 4 is a view of a typical tape showing speed and booster operation records;

Figure 5:
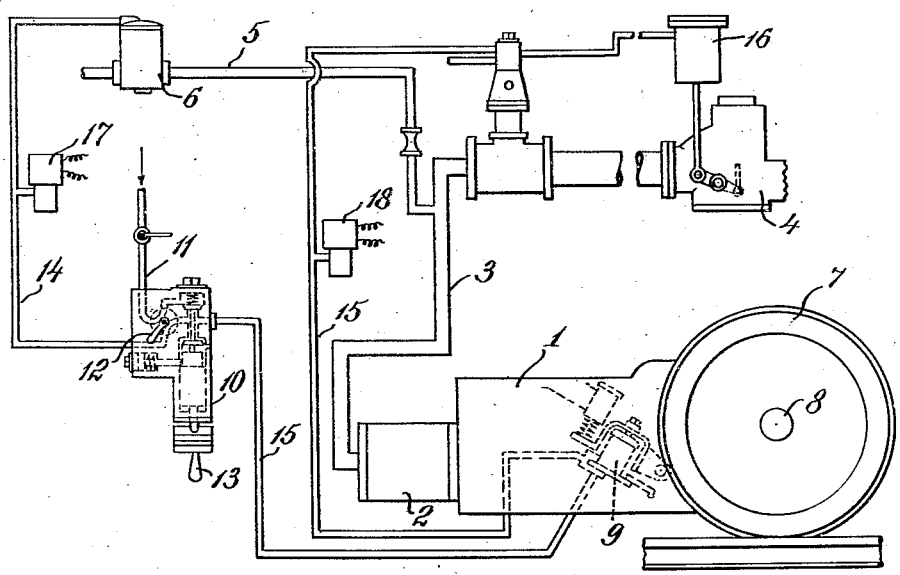
Figure 5 is a schematic lay-out showing the booster and its operating and control elements.

I shall first describe the booster operating and control elements as shown in Figure 5. In this figure, 1 represents the booster engine, 2 the booster cylinders, 3 the main steam line to the cylinder controlled by throttle valve 4, and 5 is an auxiliary steam line through which steam for idling is fed to the cylinders and controlled by a throttle valve 6. The booster engine drives the trailing truck wheels or the tender truck wheels 7 through a gear train not shown. One of the gears in the train is an idler normally out of mesh with the axle gear on axle 8. When the booster is running this idler gear is swung into and held in engagement with the axle gear by means of the clutch cylinder 9. The throttle valves 4 and 6 and the clutch cylinder 9 are all operated by compressed air controlled by the booster reverse lever pilot valve 10 in a manner that I shall now describe. Compressed air from the air reservoir passes to valve 10 through air line 11, whence it passes, depending upon the setting of idling valve lever 12 and booster latch 13, through air line 14 to the throttle valve 6 or through air line 15 to clutch cylinder 9 and throttle operating cylinder 16, or is stopped at the valve. When the valve lever 12 is set as shown in the drawings no air passes from the air line 11 and the booster is inactive. When the lever 12 is turned 90° to the left, lines 11 and 14 are placed in communication and air passes through air line 14 and opens the throttle valve 6 permitting sufficient steam to enter the booster cylinders for idling purposes. When the booster is to be run the lever 12 is returned to its original position which momentarily shuts off air from the air line 14. Thereupon the booster latch 13 is raised to open connections to air line 15 and air line 14 so that both throttle valves 4 and 6 are open and the clutch cylinder is operated to move the idler into driving engagement with the axle gear of the booster. The foregoing is a brief description of a typical booster operating and control system and of itself forms no part of the present invention.

In accordance with my invention I utilize the air pressures in air lines 14 and 15 to selectively operate my recording mechanism. I do this by means of electro-pneumatic switches 17 and 18 operatively connected to air lines 14 and 15, respectively. These switches are so designed that they are normally open and are closed when their respective air lines are put under operating pressure.

I shall now describe the recording instrument itself with particular reference to Figures 1, 2 and 3. In these figures, 18 represents the usual instrument housing containing the speedometer mechanism. On top of this housing are mounted the usual tape rolls; the supply roll 19, the registration roll 20 and the take-up roll 21. The tape 22 is fed from the supply roll, over the registration roll and onto the take-up roll at a constant speed or at a speed proportional to the speed of the locomotive over the rails. Mounted on top of the housing 18 and in front of the supply roll is a standard 23 at the upper end of which an arm 24 is pivotally mounted for limited movement about a horizontal axis. A second arc 25 is pivotally mounted upon arm 24 for limited movement about a vertical axis. This arm 25 carries a stylus in the form of a pencil 26 which is constantly urged into contact with the tape passing over the registration roll 20 by means of a spring 27 and normally draws a continuous straight horizontal line on the tape. Also carried by the standard 23 are two electromagnets 28 and 29 with their cores vertical and spaced slightly one from the other. Pivotally mounted upon the standard 23 and midway between the two electromagnets is an armature 30 articulated to arm 24 by means of a link 31. The armature 30 is normally held midway between the two electromagnets by means of compression springs 32. When either electromagnet is energized it swings the armature 30 toward it with sufficient force to overcome the resistance of its spring 32. This movement of the armature is transmitted through link 31 to the arm 24 and causes the pencil 26 to make a short vertical mark on the tape 22.

Figure 6:
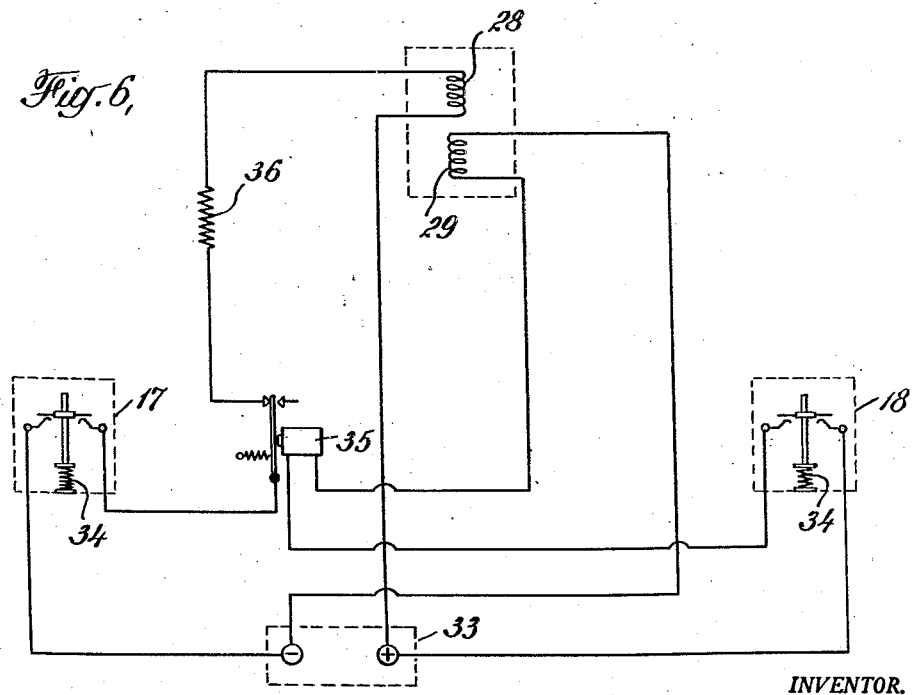
Figure 6 is a wiring diagram for the electromagnet which operates the stylus.

I shall now describe the electrical connections through which the electromagnets 28 and 29 are energized in response to operation of the booster, with particular reference to Figure 6. The coil of the upper electromagnet 28 is in series with a source of electrical energy 33 and electro-pneumatic switch 17. Normally this switch is held open by a spring 34. When the air line 14 is placed under pressure by manipulation of idler valve lever 12 the pressure of spring 34 is overcome and the switch 17 is closed thereby completing the circuit through the coil of electromagnet 28, energizing the magnet and causing armature 30 to rise suddenly, carrying with it arm 24 and pencil 26. The coil of the lower electromagnet 29 is similarly in series with the power source 33 and switch 18 and is energized when air line 15 is placed under pressure through manipulation of idling valve lever 12 and booster latch 13. This results in swinging the armature 30 downward and with it arm 24 and pencil 36. It will be noted that when the booster is running air lines 14 and 15 are both under pressure and, therefore, switches 17 and 18 would both be closed. This would result in energizing both electromagnets and interfering with the orderly operation of the recording mechanism. I have, therefore, placed a relay 35 in the system which operates to open the circuit including the upper coil when the lower coil is energized. In order to balance the resistance of the relay in the lower coil circuit I place a suitable resistor 36 in the upper coil circuit.

I shall now describe the operation of the recorder with particular reference to Figure 4. In the tape shown in this figure the lower line 37 is the speed record and the upper line 38 the booster operation record. The left-hand end of the tape shown in Figure 4 shows the train running at a uniform speed with the booster inactive. The engineer then approaches a station stop and brings his train to a standstill as shown by the precipitate drop in curve 37. Knowing that he will want to use the booster on starting from this station, the engineer, just prior to slowing down manipulates the idler valve lever 12 to start the booster idling. This is shown by the short vertical rise in line 38 followed by a horizontal line above the original horizontal line. This continues until the train has come to a full stop. On starting up, the engineer, by proper manipulation of the idler valve lever and the booster latch, throws his booster into running position and this is shown by the vertical drop in line 38 immediately above the low point in the speed curve 37. The train now accelerates and the time is approaching when the engineer should cut out his booster. Thus, at twenty-two miles an hour he throws the booster into neutral as shown by the short vertical rise in the line 38 followed by the horizontal line in neutral position. After a time the train approaches a heavy grade causing the speed to decelerate, as shown by the drop in the curve 37. The engineer knowing he will need the booster on this grade first idles it, then passes through neutral, and then when the speed has dropped to twelve miles an hour, cuts the booster in. The train accelerates slowly but finally makes the grade with the booster's help and then at twenty-two miles per hour the engineer once more cuts the booster out. The whole story of the booster operation is thus clearly written on the speed tape and shows in conjunction with the simultaneous speed record at what speeds the booster was cut in and cut out. And knowing these speeds it is a simple matter to calculate the duration of the various phases of the booster operation.

I claim:

1. In a locomotive equipped with a booster, a main steam line supplying steam to the booster for running it, a throttle valve in the main steam line, an auxiliary steam line supplying steam to the booster for idling it, a throttle valve in the auxiliary steam line and manually controlled means for selectively opening each throttle valve, the improvement which comprises means for recording the operation of the booster on a movable tape including a stylus that marks the tape, electromagnetic means for moving the stylus to make distinctive marks on the tape when the booster is idling and when the booster is running, and means operated upon movement of the throttle-valve control means to idling and to running positions for energizing the electromagnetic means to cause the stylus to make a distinctive record of the periods during which the booster is idling and during which it is running, respectively.

2. In a locomotive equipped with a booster, a main steam line supplying steam to the booster for running it, a throttle valve in the main steam line, an auxiliary steam line supplying steam to the booster for idling it, a throttle valve in the auxiliary steam line, a source of compressed air, air lines leading from each throttle valve to the source of compressed air, and manually controlled air valves for selectively connecting each throttle valve with the source of compressed air, the improvement which comprises means for recording the operation of the booster on a movable tape including a stylus that marks the tape, an armature connected with the stylus, two electromagnets, one on either side of the armature, a normally open electro-pneumatic switch in each air line and in series with one electromagnet and a source of electrical energy, operation of each manually controlled air valve to open the appropriate throttle valve closing the appropriate switch, energizing the appropriate electromagnet and causing the stylus to make a significant mark on the tape.

3. In a locomotive equipped with a booster, a main steam line supplying steam to the booster for running it, a throttle valve in the main steam line, an auxiliary steam line supplying steam to the booster for idling it, a throttle valve in the auxiliary steam line and pneumatic means for selectively opening each throttle valve, the improvement which comprises means for recording the operation of the booster on a movable tape including a stylus that marks the tape, electromagnetic means for moving the stylus to make distinctive marks on the tape, and means operated upon actuation of the pneumatic valve-control means to open the throttle valve in the main steam line, and upon actuation of the throttle valve in the auxiliary steam line, for energizing the electromagnetic means to cause the stylus to make a record of the periods during which steam is supplied to the booster through the main and auxiliary steam lines, respectively.

4. In a locomotive equipped with a booster, a main steam line supplying steam to the booster for running it, a throttle valve in the main steam line, an auxiliary steam line supplying steam to the booster for idling it, a throttle valve in the auxiliary steam line, and manually controlled means for selectively opening each throttle valve, the improvement which comprises means for recording the operation of the booster on a movable tape including a stylus that marks the tape, an armature connected with the stylus, two electromagnets, one on either side of the armature, means for energizing one electromagnet when the auxiliary steam line throttle is open to move the stylus to one position, means for energizing the other electromagnet when the main steam line throttle is open to move the stylus to another position, and means for holding the stylus in an intermediate position when neither throttle is open and the booster is inactive.

FAY D. WELDEN.